United States Patent
Garg (10) Patent No.: US 10,533,673 B2
(45) Date of Patent: Jan. 14, 2020

(54) COMPOSITE VESSEL FIRE PROTECTION SYSTEM

(71) Applicant: Quantum Fuel Systems LLC, Lake Forest, CA (US)

(72) Inventor: Mohit Garg, Lake Forest, CA (US)

(73) Assignee: Quantum Fuel Systems LLC, Lake Forest, CA (US)

(*) Notice: Subject to any disclaimer, the term of this patent is extended or adjusted under 35 U.S.C. 154(b) by 0 days.

(21) Appl. No.: 15/985,559

(22) Filed: May 21, 2018

(65) Prior Publication Data

US 2018/0266577 A1 Sep. 20, 2018

Related U.S. Application Data

(63) Continuation of application No. PCT/US2016/063374, filed on Nov. 22, 2016.

(60) Provisional application No. 62/258,978, filed on Nov. 23, 2015.

(51) Int. Cl.
*F16K 17/38* (2006.01)
*F17C 1/14* (2006.01)
*F17C 13/12* (2006.01)

(52) U.S. Cl.
CPC .............. *F16K 17/383* (2013.01); *F17C 1/14* (2013.01); *F17C 13/12* (2013.01)

(58) Field of Classification Search
CPC .. F16K 17/383; F17C 1/06; F17C 1/14; F17C 13/12; F17C 13/123; F17C 2201/0109; F17C 2201/056; F17C 2203/0619; F17C 2203/0663; F17C 2205/0317; F17C 2205/0332; F17C 2205/0394; F17C 2221/012; F17C 2221/033; F17C 2223/0123; F17C 2223/036; F17C 2250/0439; F17C 2250/0668; F17C 2260/042; F17C 2270/0168; Y02E 60/321
USPC ......................................................... 137/72
See application file for complete search history.

(56) References Cited

U.S. PATENT DOCUMENTS

| | | | | |
|---|---|---|---|---|
| 2,586,248 A | * | 2/1952 | Newman ............... | F16K 17/383 137/74 |
| 2,730,900 A | * | 1/1956 | Rowley ............... | A62C 35/645 137/67 |
| 4,085,860 A | * | 4/1978 | Hawkins ................ | F16K 17/40 220/89.4 |

(Continued)

FOREIGN PATENT DOCUMENTS

FR 2964440 A1 3/2012

OTHER PUBLICATIONS

International Patent Application No. PCT/US2016/063374; Int'l Search Report and the Written Opinion; dated Feb. 9, 2017; 9 pages.

(Continued)

*Primary Examiner* — Minh Q Le
(74) *Attorney, Agent, or Firm* — BakerHostetler (57) ABSTRACT

A localized fire protection system for composite overwrapped pressure vessels which uses net or mesh which stretches in at least one direction. They can be elastomeric or polymeric or any material and/or weave that provides said function. Wrapping sections held together via a flammable fuse connected to a relief valve under pressure from the net wrappings to block a relief valve pathway to replace stored gas in case of a localized fire.

9 Claims, 8 Drawing Sheets spool moves upward via spring and fluid path is open netting is looser (56) References Cited

U.S. PATENT DOCUMENTS

| | | | | |
|---|---|---|---|---|
| 4,600,147 | A | * | 7/1986 | Fukuta .................. A01G 15/00 239/14.1 |
| 4,714,233 | A | * | 12/1987 | Oates ..................... E21B 34/02 251/14 |
| 6,382,232 | B1 | | 5/2002 | Portmann |
| 7,703,640 | B1 | * | 4/2010 | Hollars ................ F16K 17/383 169/57 |
| 2007/0261734 | A1 | * | 11/2007 | Maus .................... F16K 17/383 137/74 |
| 2008/0066805 | A1 | | 3/2008 | Winter et al. |
| 2008/0148853 | A1 | * | 6/2008 | Kim ........................ F17C 13/02 73/587 |
| 2009/0288713 | A1 | | 11/2009 | Hirakata |
| 2009/0308874 | A1 | | 12/2009 | Lindner et al. |
| 2011/0083756 | A1 | | 4/2011 | Hwang et al. |
| 2011/0127263 | A1 | * | 6/2011 | Lee ........................ F17C 13/12 220/89.2 |
| 2012/0132298 | A1 | | 5/2012 | Ishitoya et al. |
| 2016/0033085 | A1 | * | 2/2016 | Sirosh .................... F17C 13/12 137/2 |
| 2017/0082245 | A1 | * | 3/2017 | Schwartz ............... F17C 13/12 |
| 2018/0259124 | A1 | * | 9/2018 | Kondo .................. F17C 13/04 |

OTHER PUBLICATIONS

International Patent Application No. PCT/US2016/063374; Int'l Preliminary Report on Patentability; dated Jun. 7, 2018; 8 pages.
European Patent Application No. 16869182.2; Extended Search Report; dated Oct. 24, 2018; 8 pages.

* cited by examiner

COMPOSITE VESSEL FIRE PROTECTION SYSTEM

CROSS-REFERENCE TO RELATED APPLICATIONS

This application claims priority to U.S. Provisional Patent Application No. 62/258,978 filed Nov. 23, 2015, the contents of which are hereby incorporated in their entirety as if fully set forth herein.

FIELD

Protect the tank from localized fires that may not be sensed by a thermally-activated pressure relief device (TPRD) prior to a tank rupture.

BACKGROUND

Evaluation of fire performance of the fuel system is limited to the fire testing of the hydrogen and compressed natural gas (CNG) fuel tanks and thermally-activated pressure relief device "TPRD" itself. According to a NHTSA report, between 2000 and 2008, there have been over 20 failures of CNG tanks onboard vehicles. The single largest cause of these failures (over 50%) was fire. These CNG cylinder failures have occurred on OEM passenger vehicles, as well as OEM transit buses. Note that the effect of localized fires is more pronounced on cylinders of longer length, as TPRD locations are typically spaced far apart. Filament wound or composite overwrapped pressure vessels (COPVs) are highly susceptible (epoxy in the composite shell degraded performance at higher temperatures) to rapid degradation due to localized fires. Rapid-activating Pressure Relief Devices (PRDs) are critical to the protection of all such fuel tanks, but historical tank failure data indicates that these devices are not optimally designed to mitigate the effect of localized fires.

The fire protection of hydrogen and CNG tanks for vehicles currently relies on the use of TPRDs. Most relevant standards (e.g., NGV2) specify that this thermally-activated pressure relief device shall only activate when exposed to heat. PRDs are not used as the excessive pressure required for activation will not be achieved if the tank is only partially filled.

Typically the TPRDs can be found attached to a valve at one or both ends of a tank. As specified in the bonfire test requirements of various CNG and hydrogen tank standards, the length of the fire must be set to 1.65 m to evaluate the effectiveness of a TPRD to protect a tank. Note that current TPRD designs will only function if they are exposed to excessive heat, thus a fire occurring on a tank, remote from TPRD, will not activate that device. Thus on tanks exceeding this length (1.65 m), it is often necessary to introduce high pressure piping and additional TPRDs along the tank to ensure at least one TPRD is within the bonfire. This usually results in added cost, weight, and still no reliable three-dimensional fire protection system.

DISCLOSURE

Aspects of reliable, cost-effective, light-weight, low-volume, and fast acting venting type methods, systems, and devices three-dimensional protection system from localized fire for COPVs are disclosed herein. The proposed fire protection system for an individual tank will minimize the need to try and address all external possibilities of a localized fire condition occurring. A system has at least a plurality of nettings sections stretchable in at least one direction, linked via one or more fuse wires around a COPV tank which are anchored on both ends of the tank to an on/off means, such as an anchor ring linked to a PRD and/or a TPRD which initiates the relief valve when activated via a force differential when a localized fire triggers the system.

The netting sections are slid over the tank like a sock or sleeve and/or wrapped around the tank. The fuse wires are oriented along the hoop direction of the tanks and are weaved through the sections of net. Both ends of the weave net are anchored to the COPV. The proximal end being fixed and the distal end being movable with the actuator connected to the TPRD. The anchoring ring which is an actuator at the distal end is connected to a tensioning bolt which is further connected to a leg or metallic pin from the TPRD device. The TPRD device is installed near the valve assembly at one end only. The ring transfers the tension load in the netting to the pin connected to the TPRD spool and holds it in a closed position. Once the load from the net is released, when a localized fire burns it, the thermally-activated pressure relief device (TPRD) spool slides to the open position and immediately releases the pressurized gas from the tank and bypasses the Pilot operated relief valve.

Aspects of exemplary implementations include a method to release pressurized fuel in a composite vessel during a fire, the method including surrounding a pressurized composite vessel with a plurality of net coverings; anchoring the first net covering to the proximal end of a pressure vessel; affixing the additional net coverings to the first net covering via one or more temperature sensitive fuse wire; affixing the net covering at the distal end of the pressure vessel to an actuator ring; connecting the actuator ring to a TPRD system to compress a spring valve having a spool blocking the fluid path of fuel to prevent passage through the TPRD unless the fuse is exposed to a temperature beyond a threshold level; and, wherein the fuse degrades and releases tension between the net coverings thereby releasing the actuator which releases fuel from the vessel.

DRAWINGS

FIGS. 5A-6B illustrate aspects of the on/off actuation of a TPRD system.

All content, descriptions, and callouts in the Figures are hereby incorporated by this reference as if fully set forth herein.

FURTHER DISCLOSURE

FIGS. 1-6B illustrate a fuel tank (such as a metal tank, or plastic tank or a composite overwrapped pressure vessel "COPV") 10 with a stretchable netting or mesh system 20 which is formed from a series of netting in sections 22A through 22F held together by one or more frangible fuse lines or wires 30 woven in between the sections of netting thereby holding the sections together thereby forming the mesh system of the combined parts. The tank may be elongated. The netting or mesh 20 is connected to a TPRD via an anchor such as a ring 35 at the proximal end 12 and is shown over a COPV and an actuator ring 37 at the distal end 14 of the COPV attached to a fitting 38, which may be an adjustable tension bolt 39. The valve 40 (which is in fluid connection 41 with the interior of the COPV) at a polar end 43 of the COPV provides a fluid path to a TPRD 50. The TPRD contains a spring valve which is held in the shut-off position via the tension from the netting system 20 applied to the TPRD body 50 until and unless the force provided by the netting or mesh system 20 is reduced/released.

The netting sections or coverings may be formed in a circular shape such as a cylinder with open ends that can be slid over a cylindrical structure.

Those of ordinary skill in the art will recognize that the system may be duplicated at both ends of the COPV wherein the netting is anchored center on the tank and a two side mirrored system is provided wherein either TPRD (one located at each of the distal and proximal ends) may be actuated. Such dual system is within the scope of this disclosure. This setup will increase the reliability of the localized fire protection system.

The netting material chosen should be able to stretch with the increase in internal pressure without activating the TPRD. Note that the tank will expand when filled to higher pressures. The netting should not tear while handling the tank or if dropped; should be cheap and easy to machine; should be able to manufacture and install for different tank sizes. The material should not creep with time and release the tension. If it is determined through testing, the netting material relaxes over time significantly; regular inspections should be defined to ensure proper functioning of the fire protection system. The package needs to be tested for reliability and repeatability. The smallest concerned flame size can be used in sizing the net and fuse wire spacing on the net for a reliable design. The netting may be constructed of a stiff fiber (polymer fiber) and the fuse wires (30) should be pre-selected to ignite at a predetermined threshold temperature. Fuse wires materials may, in some instances be selected to burn underwater. It is known in the art that fuse materials such as igniter cords may have an inner core for improved mechanical strength. In instances when improved mechanical strength of a fuse (30) is required, such reinforced fuse wires may be used and are within the scope of the invention.

O-rings used within TPRD should be able to sustain fuel temperature during fast defueling temperature variation, stored gas compatibility, and environmental degradation.

Figure 1:
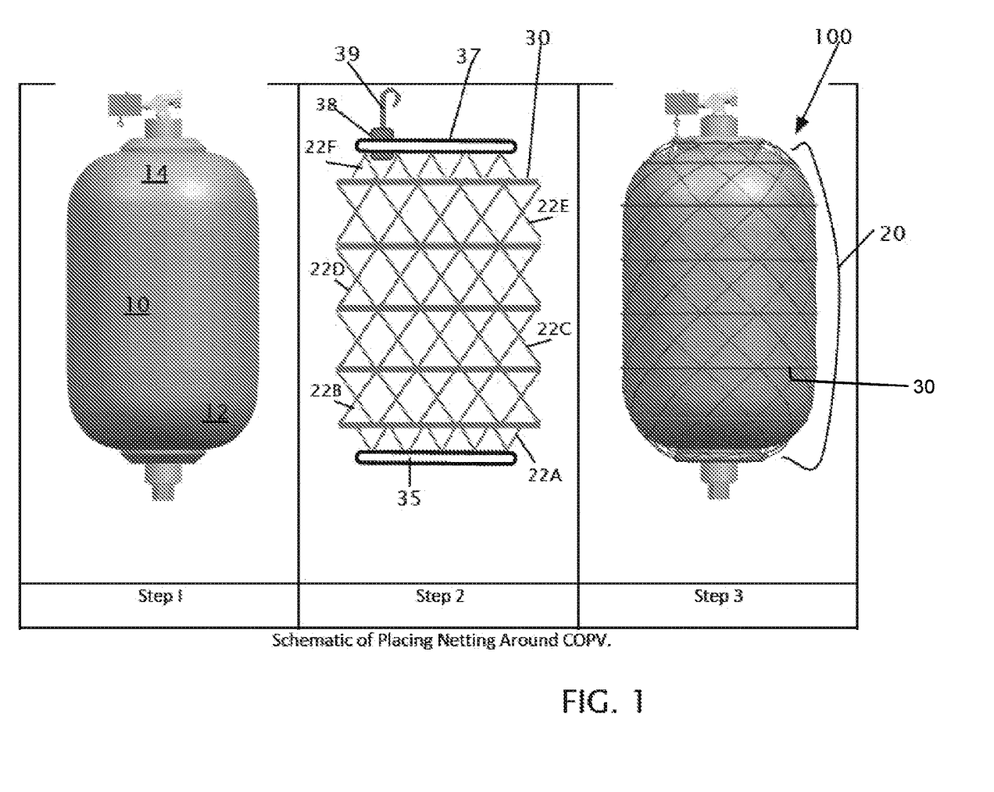
FIGS. 1 and 2 illustrate aspects of a TPRD system.
Figure 2:
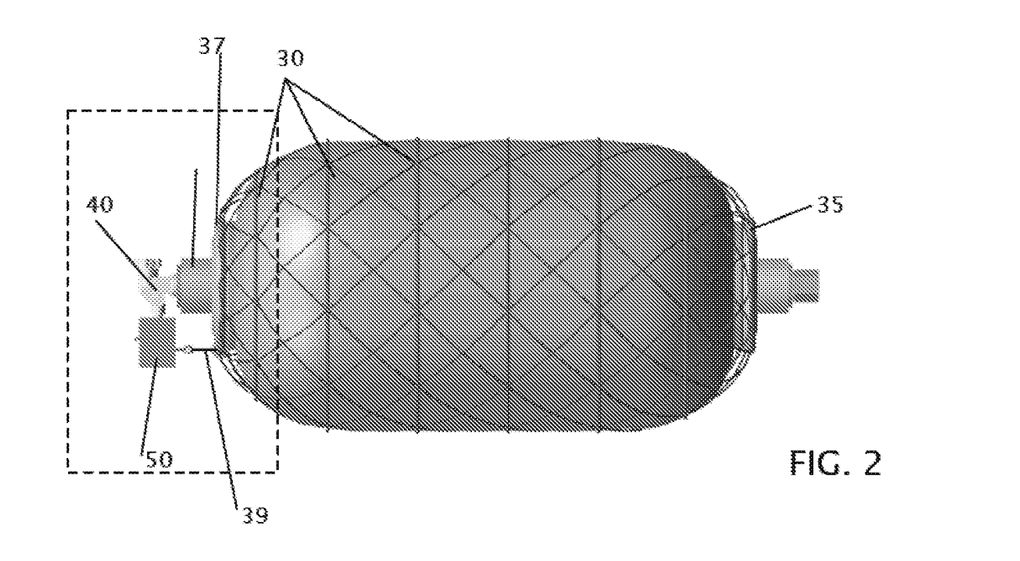
Figure 3:
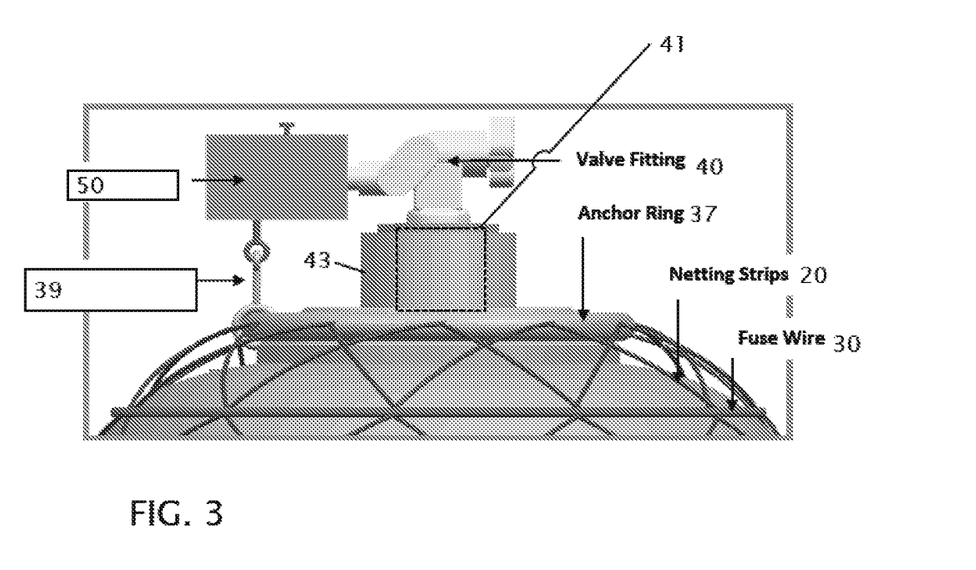
FIG. 3 illustrates aspects of a TPRD actuation system.
Figure 4:
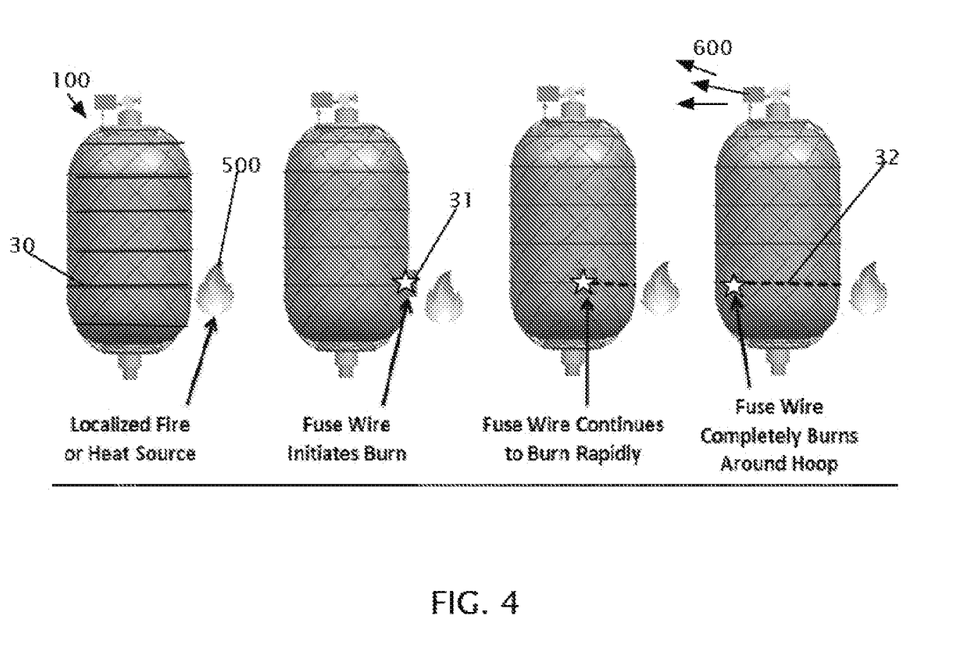
FIG. 4 illustrates a time sequence of a TPRD system.
Figure 5A:
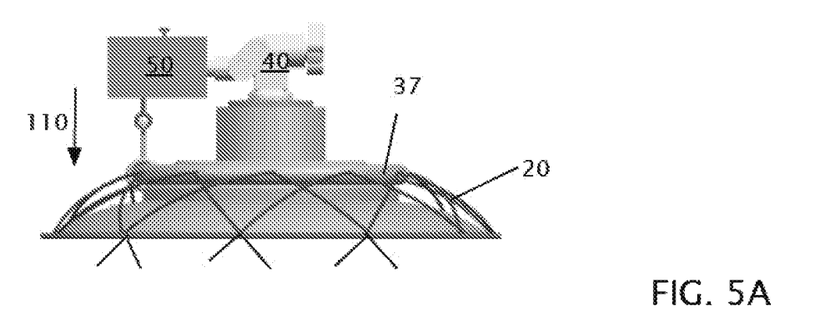
Figure 5B:
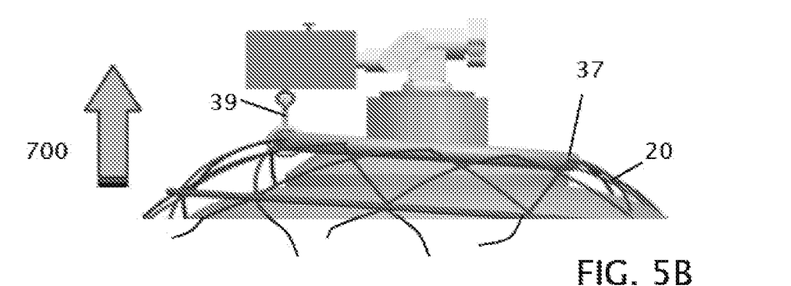
Figure 6A:
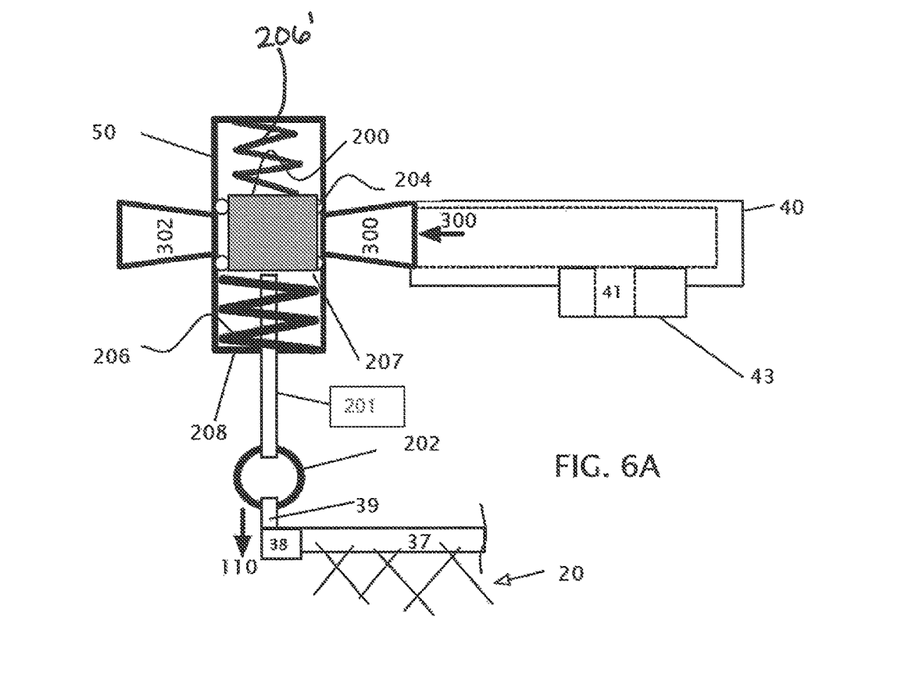
Figure 6B:
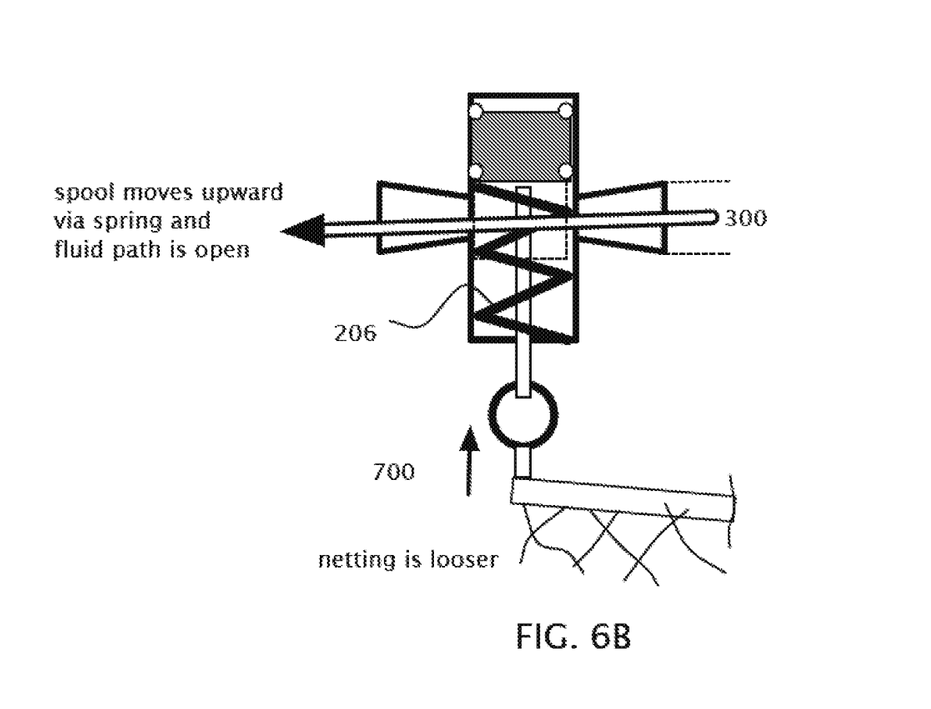

A sequence of valve activation via aspects of the system and method disclosed herein is illustrated in FIG. 4. The fire prevention system 100 includes at least a tank with TPRD device that operates when a localized fire 500 is near some location of the system at a minimal level which lights the fuse wire 30 wherein the fuse is on fire 31 and as it burns it becomes the degraded broken fuse 32 wherein it no longer holds sections 22A through 22F together under the same force thereby releasing the force on the TPRD/PRD body 50 and releasing or purging the stored gas 600.

FIGS. 5A-6B illustrate the operation of the fire prevention system 100. A movable spool 200 with an extended leg 201 is connected via a ring-connector 202 to the tensioning bolt 39 which is attached to the actuator ring 37. A force 110 provided by the system 100 keeps the TPRD in the closed position with the spool blocking the passage 300 from the valve 40 (forming a PRD) to the vent 302. O-rings or other seals 204 are also affixed to the spool 200. Within the TPRD is a spring 206 is interposed between the bottom 207 of the spool 200 and the bottom 208 of the TPRD/PRD body 50. The netting system 20 is connected to the actuator ring 37 applying a load to the spool 200 and compressing the spring 206 which positions the spool 200 to block the fluid pathway 300. Optionally a positioning member such as a low force coil spring 206' may be placed above the spool to help position the spool in the fluid pathway when the spring 206 is compressed. When the load on the actuator ring 37 is released the force on the spring is relived and the spool is pushed up and opens the pathway 300 for the release of stored gas via the vent 302. The release takes place when a fuse degrades and one or more sections of netting are at least partially disassociated with the other section(s) of netting thereby reducing the force on the actuator.

Advantages of this system include one or more of that the fuse wire will not ignite under impact; will be moisture resistant (it is plastic coated); will be able to burn underwater; will not require direct flame to ignite; and a temperature above 150° C. (in air) will be sufficient to burn the fuse wire.

The sequence of assembly, in some instances includes, the netting wrapped around the tank such that the fuse wire or wires 30 are weaved thru the net. Both ends of the weave net will be passed thru a metallic ring placed around the bosses. The actuator ring 37 is connected to a tensioning bolt (39) which is further connected to the extended leg 201. A TPRD device will be installed near the valve assembly at one polar end of the tank. The ring transfers the tension load in the netting to the TPRD and holds it in closed position. Once the load from the net is released, when a localized fire burns it, the TPRD slides to open position and immediately releases the pressurized gas from the tank and bypasses the Pilot operated relief valve if installed with the TPRD system.

It will be understood that various aspects or details of the disclosures may be changed, combined, or removed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed:

1. A fire activatable pressure relief method for pressurized gaseous fuel tanks, the method comprising:
   surrounding a pressurized gaseous fuel tank or vessel (10) having a fluid connection into the tank and a valve (40) at its distal end (14) with a plurality of stretchable net coverings (22A-22F);
   anchoring a first covering (22A) to one end (12) of the tank;
   affixing the additional net coverings (22B-22F) to the first covering forming a mesh (20) via one or more fire and temperature sensitive fuse wire (30);
   affixing the net covering at the distal end (14) of the pressure vessel to an actuator ring (37);
   connecting the actuator ring to a thermally-activated pressure relief device "TPRD" system (50) to compress a spring (206); and,
   a movable spool (200) associated with the spring moves within the TPRD system to block the fluid path (300) of stored gas through the TPRD to the atmosphere unless a fuse is exposed to a temperature beyond a threshold level.

2. The method of claim 1 wherein the tank is filled with a pressurized gaseous fuel.

3. The method of claim 2 wherein the tank is a composite overwrapped pressure vessel.

4. The method of claim 3 wherein the mesh stretches without activating the actuator ring when the tank is filled.

5. The method of claim 2 wherein the fuse is exposed to a temperature beyond a predetermined threshold and degrades thereby releasing the actuator and purging fuel from the TPRD.

6. A fire activated frangible net system comprising stretchable net coverings (22A-22F) connected to each other via a fire and temperature sensitive fuse wire woven in and out of a mesh of one net covering and an adjacent net covering; and
- a composite overwrapped pressure vessel "COPV" having a proximal end (12), and a distal end (14);
- a fluid connection (41) into the COPV via a valve (40) at the distal end (14);
- a thermally-activated pressure relief device "TPRD" (50) fluidly connected to the valve;
- the first end of the net coverings anchored to the proximal end;
- the second end of the net system connected to an actuator ring (37) which is connected to the TPRD.

7. The system of claim 6 wherein the net coverings are generally an open ended mesh cylinder.

8. The system of claim 7 wherein the net coverings are anchored at a first end and connected to a pressure sensitive valve at a second end.

9. The system of claim 6 wherein the fuse wire is exposed to a temperature beyond a predetermined threshold and degrades thereby releasing force on the actuator ring and allowing a movable spool (200) within the TRPD to open a fluid pathway to purge fuel from the COPV.

* * * * *